United States Patent [19]

Knott, II et al.

[11] 4,355,721

[45] Oct. 26, 1982

[54] PACKAGE FOR FOOD PRODUCTS

[75] Inventors: Jack E. Knott, II, Menasha; Matthew S. Koschak; John P. Adams, both of Appleton, all of Wis.

[73] Assignee: American Can Company, Greenwich, Conn.

[21] Appl. No.: 173,748

[22] Filed: Jul. 30, 1980

Related U.S. Application Data

[63] Continuation of Ser. No. 38,187, May 11, 1979, abandoned.

[51] Int. Cl.³ .................. B65D 85/72; B65D 65/40; B65D 81/18; B32B 9/04
[52] U.S. Cl. ............... 206/524.2; 229/3.5 R; 229/43; 206/525; 206/484; 426/113; 426/127; 428/35; 428/516; 428/475.8
[58] Field of Search .......... 206/525, 527, 524.2, 206/484; 229/3.5 R, 43, 55; 150/0.5; 426/113, 127; 428/35, 516, 475.8

[56] References Cited

U.S. PATENT DOCUMENTS

| | | | |
|---|---|---|---|
| T904,007 | 11/1972 | Garner | 264/45 |
| T922,007 | 5/1974 | Smith | 264/55 |
| 2,418,856 | 4/1947 | Stacy | 18/30 |
| 2,470,089 | 5/1949 | Booth | 18/59 |
| 2,541,478 | 2/1951 | Nadeau et al. | 154/129 |
| 2,679,969 | 6/1954 | Richter | 229/3.5 |
| 2,710,987 | 6/1955 | Sherman | 18/5 |
| 2,781,551 | 2/1957 | Richerod | 18/55 |
| 2,805,787 | 9/1957 | Sherman | 220/15 |
| 2,996,764 | 8/1961 | Ross et al. | 18/59 |
| 3,016,579 | 1/1962 | Shlitzkus | 18/59 |
| 3,023,461 | 3/1962 | Sherman | 18/55 |
| 3,075,857 | 1/1963 | Fior et al. | 117/76 |
| 3,082,484 | 3/1963 | Sherman | 18/55 |
| 3,103,036 | 9/1963 | Nave et al. | 18/5 |
| 3,247,550 | 4/1966 | Haines | 18/36 |
| 3,281,899 | 11/1966 | Dacco | 18/30 |
| 3,322,869 | 5/1967 | Scott, Jr. | 264/90 |
| 3,339,240 | 9/1967 | Corbett | 18/30 |
| 3,409,710 | 11/1968 | Klygis | 264/98 |
| 3,457,337 | 7/1969 | Turner | 264/98 |
| 3,496,061 | 2/1970 | Freshour et al. | 161/254 |
| 3,524,795 | 8/1970 | Peterson | 161/165 |
| 3,531,553 | 9/1970 | Bodkins | 264/45 |
| 3,540,962 | 11/1970 | Anzawa et al. | 156/244 |
| 3,542,712 | 11/1970 | Gorton et al. | 260/23 |
| 3,552,638 | 1/1971 | Quackenbush | 161/254 |
| 3,560,325 | 2/1971 | Sogi et al. | 161/165 |
| 3,595,740 | 7/1971 | Gerow | 161/254 |
| 3,599,290 | 8/1971 | Garner | 18/30 |
| 3,600,487 | 8/1971 | Zavasnik | 264/89 |
| 3,616,189 | 10/1971 | Harr | 161/190 |
| 3,625,348 | 12/1971 | Titchenal et al. | 206/46 |
| 3,635,624 | 1/1972 | Nakakoshi et al. | 425/133 |
| 3,673,055 | 6/1972 | Sheld | 161/183 |
| 3,690,797 | 9/1972 | Garner | 425/146 |
| 3,716,612 | 2/1973 | Schrenk et al. | 264/241 |
| 3,751,534 | 8/1973 | Otley | 264/45 |
| 3,767,523 | 10/1973 | Schwarz | 161/254 |
| 3,767,742 | 10/1973 | Robin | 264/45 |
| 3,793,410 | 2/1974 | Garner | 254/45 |
| 3,801,254 | 4/1974 | Godtner | 425/380 |
| 3,801,684 | 4/1974 | Schrewe et al. | 264/40 |
| 3,809,733 | 5/1974 | Sandiford et al. | 264/45 |
| 3,819,792 | 6/1974 | Ono et al. | 264/95 |
| 3,825,637 | 7/1974 | Robin | 264/55 |
| 3,857,754 | 12/1974 | Hirata et al. | 161/227 |
| 3,865,915 | 2/1975 | Garner | 264/55 |
| 3,873,656 | 3/1975 | Garner | 264/55 |
| 3,878,282 | 4/1975 | Bonis et al. | 264/97 |
| 3,882,259 | 5/1975 | Nohara et al. | 428/35 |
| 3,892,828 | 7/1975 | Weatherly et al. | 264/89 |
| 3,894,823 | 7/1975 | Hanning | 425/130 |
| 3,901,958 | 8/1975 | Doll | 264/45 |
| 3,908,070 | 9/1975 | Marzolf | 428/474 |
| 3,921,856 | 11/1975 | Langecker | 222/132 |
| 3,931,449 | 1/1976 | Hirata et al. | 428/474 |
| 3,932,692 | 1/1976 | Hirata et al. | 428/474 |
| 3,932,693 | 1/1976 | Shaw et al. | 428/518 |
| 3,943,219 | 3/1976 | Aoki | 264/97 |
| 3,947,176 | 3/1976 | Rainville | 425/130 |
| 3,949,114 | 4/1976 | Viola et al. | 428/337 |
| 3,949,135 | 4/1976 | Vercauteren | 428/215 |
| 3,950,483 | 4/1976 | Spier | 264/328 |
| 3,953,660 | 4/1976 | Ishida | 428/518 |
| 3,962,396 | 6/1976 | Ono et al. | 264/98 |
| 3,972,664 | 8/1976 | Fillmann | 425/130 |
| 3,988,499 | 10/1976 | Reynolds | 428/474 |
| 3,997,677 | 12/1976 | Hirsch et al. | 426/113 |
| 3,997,703 | 12/1976 | Nakashio et al. | 428/457 |
| 4,004,868 | 1/1977 | Ohdate | 425/130 |
| 4,014,966 | 3/1977 | Hanning | 264/45 |

| | | | |
|---|---|---|---|
| 4,029,454 | 6/1977 | Monnet | 425/130 |
| 4,029,841 | 6/1977 | Schmidt | 428/325 |
| 4,035,466 | 7/1977 | Langecker | 264/328 |
| 4,044,187 | 8/1977 | Kremkau | 428/212 |
| 4,047,868 | 9/1977 | Kudo et al. | 425/133 |
| 4,047,873 | 9/1977 | Farrell | 425/523 |
| 4,052,497 | 10/1977 | Monnet | 264/255 |
| 4,055,672 | 10/1977 | Hirsch et al. | 426/127 |
| 4,055,698 | 10/1977 | Beery | 428/262 |
| 4,058,647 | 11/1977 | Inoue et al. | 428/474 |
| 4,064,296 | 12/1977 | Bornstein et al. | 428/35 |
| 4,066,820 | 1/1978 | Kelly et al. | 428/483 |
| 4,079,850 | 3/1978 | Suzuki et al. | 125/1 |
| 4,082,854 | 4/1978 | Yamada et al. | 428/475.8 |
| 4,107,362 | 8/1978 | Valyi | 428/35 |
| 4,123,576 | 10/1978 | Kobayashi et al. | 428/35 |
| 4,161,562 | 7/1979 | Yoshikawa et al. | 428/215 |
| 4,174,413 | 11/1979 | Yasuike et al. | 428/35 |
| 4,239,826 | 12/1980 | Knott et al. | 428/516 |
| 4,254,169 | 3/1981 | Schroeder | 428/516 |
| 4,255,490 | 3/1981 | Katsura | 428/475.8 |
| 4,261,482 | 4/1981 | Yamada et al. | 222/215 |

FOREIGN PATENT DOCUMENTS

| | | |
|---|---|---|
| 1950212 | 10/1969 | Fed. Rep. of Germany . |
| 2115269 | 3/1971 | Fed. Rep. of Germany . |
| 2527166 | 6/1975 | Fed. Rep. of Germany . |
| 1106628 | 12/1955 | France . |
| 522838 | 4/1955 | Italy . |
| 44-75441 | of 1969 | Japan . |
| 45-39190 | of 1970 | Japan . |
| 45-40435 | of 1970 | Japan . |
| 46-29980 | of 1971 | Japan . |
| 47-1120 | of 1972 | Japan . |
| 49-21424 | of 1974 | Japan . |
| 1023639 | 3/1966 | United Kingdom . |
| 1362133 | 2/1973 | United Kingdom . |
| 1329257 | 9/1973 | United Kingdom . |
| 1510115 | 5/1978 | United Kingdom . |
| 1510116 | 5/1978 | United Kingdom . |

OTHER PUBLICATIONS

"7 Kurary EVAL Resin" (author & date unknown).
"Kurary EVAL Film" (author & date unknown).
"PLEXAR-Novel Extrudable Adhesive Resins", Shida et al. (date unknown).
"Coextrusion-Blow Molding for Gas Tanks and Industrial Parts", *Modern Plastics*, pp. 70–73 (Mar., 1977).
"Injection Blow Molding", *Plastics World,* pp. 30–32 (May 19, 1975).
"Japanese Blow Moulding Process", *European Plastics News,* p. 26 (Mar. 1975).
"Multi-Layer Blow Molding Technique Using Ring-Piston Accumulator Method", Iwawaki, et al. (undated).
IHI "IPB" (date and author unknown).
"Multicomponent Injection Molding", *Plastics Machinery & Equipment,* pp. 16–23 (Jan. 1978).
"Coinjection Molding", M Modern Plastics Encyclopedia, pp. 316–318 (1977–1978).
"Foam Profiles", *Plastics Machinery & Equipment,* pp. 11–15 (Nov. 1977).
"Battenfeld Success in Multi-Component Structural Moulding Technology", European Plastics News, p. 29, etc. (May 1977).
"Multicomponent Injection Molding", *Modern Plastics,* pp. 68–69 (Apr. 1977).
"The Two-Component Foam (TCF) Process", *Journal of Cellular Plastics,* pp. 277–283 (Sep./Oct. 1976).
"Coinjection: New Molding Technology", *Modern Plastics,* pp. 40–42 (Jul. 1976).
"Injection Molding of Plastic Foams", Plastics Design & Processing, pp. 18–20 (Feb. 1971).
"The Shape of Plastics Processing", Plastics Design & Processing, pp. 12–16 (Dec. 1970).
"New Technique Permits Injection Molding Sandwich Structure", Process Engineering News, p. 13 (Nov. 1970).
"Finding the Way to a Smooth Surface in Structural Foam", Plastics Engineering, pp. 26–30 (May 1976).
"An Experimental Study of Sandwich Inspection Molding", Polymer Engineering and Science, vol. 15, No. 7, pp. 481–485 (Jul. 1975).
"Billion Demonstrates Sandwich Molder", European Plastics News, p. 4 (Jun. 1974).
"Flow Visualization for Injection Molding", Polymer Engineering and Science, vol. 14, No. 3, pp. 212–221 (Mar. 1974).
"Two-Component Injection-Molding Machine", Plastics Machinery & Equipment, p. 11 (Feb. 1974).
"Serving Up a New Plastic Sandwich", SPE Journal, vol. 27, pp. 38–42 (Sep. 1971).
"Stratified Two-Phase Flow of Molten Polymers", Polyer Engineering and Science, vol. 17, No. 9, pp. 671-681 (Sep. 1977).
"Co-Extrusion", Plastics Technology, pp. 61-71 (Feb. 1977).
"Co-Extrusion", Plastics Technology, pp. 45-49 (Feb. 1976).

*Primary Examiner*—William T. Dixson, Jr.
*Attorney, Agent, or Firm*—Stuart S. Bowie; Stanley L. Amberg

[57] ABSTRACT

This application is concerned with food packages made from sheet or film into the forms of heat sealable pouches, bags, or covered trays in which the food product is placed, the package sealed, and the packaged food processed in a pressure cooker or retort to permit the packaged food to be stored without refrigeration. Certain food products can be rendered commercially sterile by hot filling the package at temperatures below boiling to permit storage for long periods without refrigeration. While still in the sealed package of the present invention, the consumer can heat or cook the food by immersion in boiling water or by microwave oven. The sheet or film is a multilayer construction wherein each layer performs specific functions and the choice of materials for the layers is interdependent to provide a film structure having all desired properties at the least cost.

16 Claims, 6 Drawing Figures

PACKAGE FOR FOOD PRODUCTS

This is a continuation, of application Ser. No. 38,187, filed May 11, 1979 now abandoned.

BACKGROUND

Heat sealed sheet or film food packages are in use for foods which are preserved by refrigeration or for dried foods. The film or sheet structure used for these purposes must have a heat sealable inside surface, be relatively impervious to oxygen and moisture, and have an outside surface of sufficient durability to protect the integrity of the package. The materials must not adversely affect the food product.

The ability to hot fill or to retort foods in sheet or film packages permits the foods to be stored without refrigeration. Commercial sterilization by hot filling or retorting imposes several additional restrictions on the choice of materials for the sheet or film structure. The heat seal must survive commercial sterilization temperatures of over 180° or typical retort conditions of steam or water at 250° F. or more under pressure for one half hour or more. The structure must not delaminate, shrink, or wrinkle as a result of the sterilization. The oxygen and water barrier properties must not be prematurely adversely affected by the conditions of commercial sterilization. The structure must be adequately strong to permit handling of the package while still hot. The additional requirements imposed by hot filling or by retorting rule out many of the materials and structures commonly used for non-restored film or sheet food packages.

Retortable sheet or film packages have been tried in which the barrier layer is aluminum foil. Suitable materials for the inside and outside surfaces are bonded to the foil. An aluminum foil containing structure cannot be made in a single step as is the case with multi-layer all polymeric structures which can be made in a single coextrusion operation. An aluminum foil containing structure is opaque visually and is not suited to microwave oven cooking of the packaged food.

SUMMARY OF THE INVENTION

Food packages in the form of heat sealable pouches, bags, or covered trays are formed from coextruded, multi-layer, all polymeric film or sheet. The packages must withstand commercial sterilization conditions. The sheet or film structure should be capable of being transparent and the packages should be suited to microwave cooking of the food in the package by the consumer. The multi-layer film or sheet is of the general structure: Outside layer/barrier layer/heat sealable inside layer. Additional interior layers may by employed between the above noted layers.

DETAILED DESCRIPTION

Figure 1:
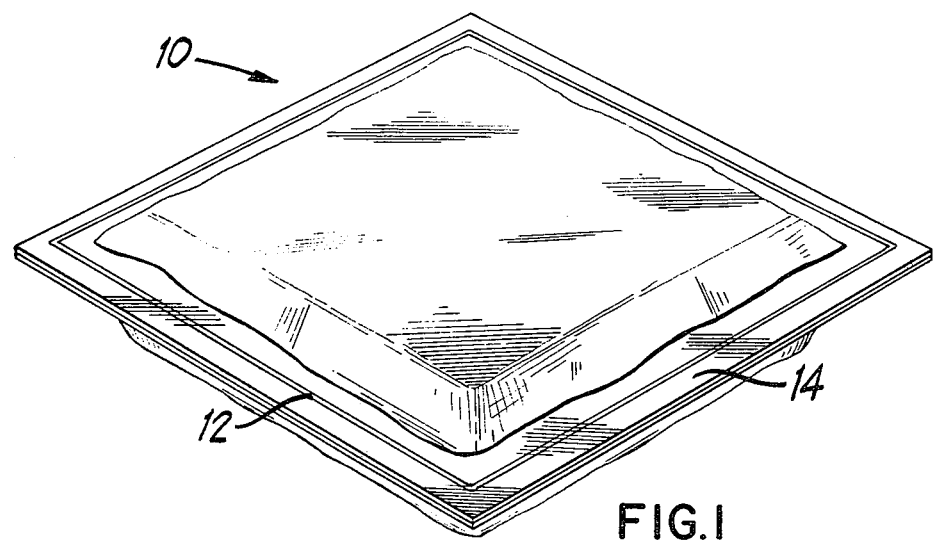
Figure 2:
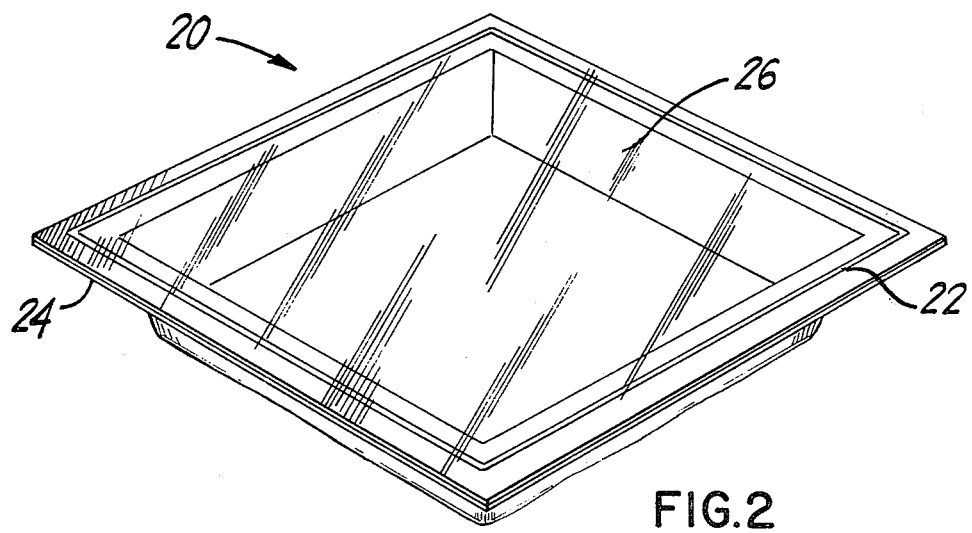
Figure 3:
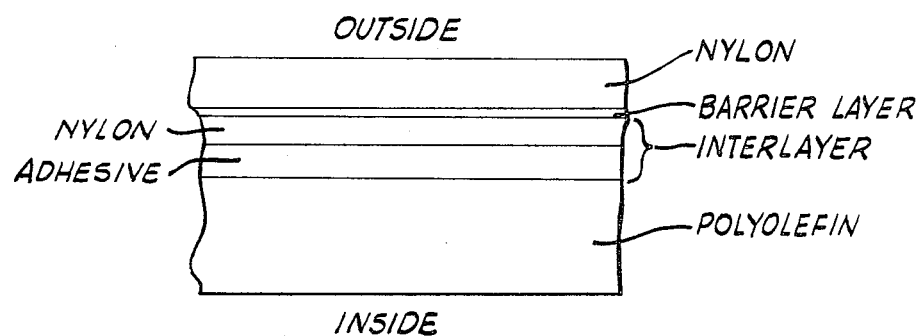
Figure 4:
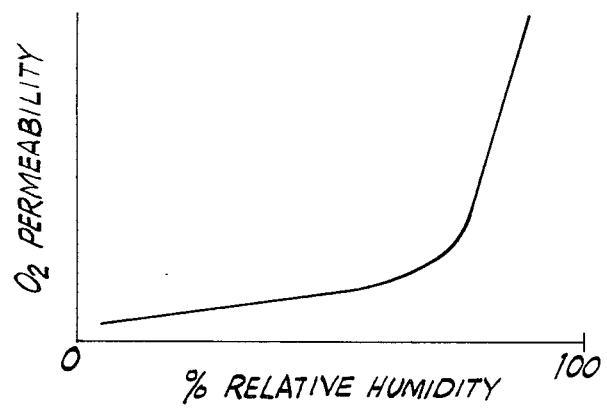
Figure 5:
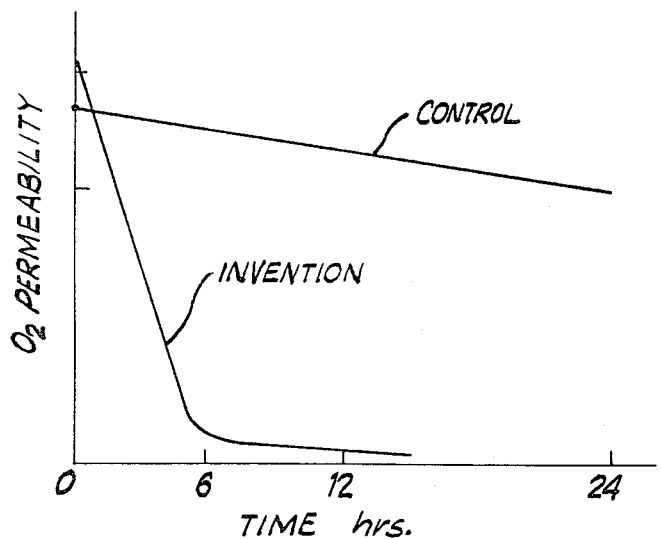
Figure 6:
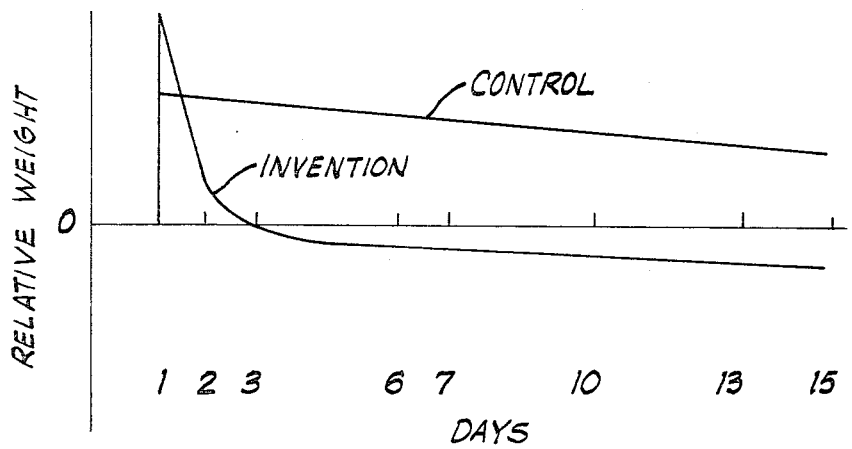

In the drawings:

FIG. 1 is a perspective view of a pouch according to the present invention,

FIG. 2 is a perspective view of a covered tray according to the present invention, FIG. 3 is an enlarged cross-sectional view of the film or sheet material used in packages according to the invention, FIG. 4 is a graph showing the oxygen permeability of ethylene-vinyl alcohol copolymer film as a function of moisture content, FIG. 5 is a graph comparing oxygen permeability as a function of time of a film according to the invention with a similar film not according to the invention, and FIG. 6 is a graph comparing the moisture content as a function of time of the film of a package according to the invention with a similar film not according to the invention.

Each of the several layers of the sheet or film structure serves particular purposes and must satisfy particular requirements. Certain requirements of the materials are shared in common by all layers. All layers must be of sufficiently flexible materials to result in a flexible structure which will not fracture in use. For economical manufacture, the materials of all layers should be coextrusible, that is, the rheology of each material in the molten state should allow all the layers to be extruded simultaneously to join in an integrated film structure. To produce an inexpensive film, each material must be relatively inexpensive as measured by the relative amount of that material present in the finished structure. Since the structure should be capable of being made reasonably transparent to microwaves in an oven, and for some applications transparent visually, each layer must be. A decision to use a particular material for one layer affects the choice of materials for other layers. The following description of requirements and preferred materials begins with the interior barrier layer.

The barrier layer must provide a sufficient barrier to oxygen to provide adequate shelf-life for the food in the package. In the thickness required for adequate barrier properties, the material must not be expensive. Ethylene-vinyl alcohol copolymer (EVOH) provides superior oxygen impermeability when compared with other polymeric materials such as saran and acrylonitrile which have been employed in packages for oxygen barrier qualities. A very thin layer of EVOH will provide an adequate barrier to oxygen. Extrusible grades of EVOH are available under the name EVAL from Kuraray Co., Ltd. of Japan. The oxygen barrier quality of EVOH is adversely affected by the presence of water in the EVOH layer. A small quantity of water will raise the moisture content of a thin layer of EVOH to an extent where the oxygen barrier quality of the layer is severely affected. The oxygen barrier quality of EVOH is restored when the moisture is removed.

Polyolefins such as polyethylene, polypropylene, and blends and copolymers of the two are considered to be excellent moisture barriers. Polyolefins are heat sealable. High density polyethylene, polypropylene, and blends and copolymers of polypropylene and polyethylene melt at temperatures sufficiently high to provide heat seals which survive hot filling at temperatures in the neighborhood of 190° F. or retorting at up to 260° F., yet seal at temperatures between 350° F. and 400° F. attainable with existing heat seal equipment at normal sealing pressures and times. Consequently, high melting temperature polyolefins are suitable for use as the inside heat seal layer. However, the permeability of polyolefins to water is greatly increased at the elevated temperatures encountered in commercial sterilization. Thus, a polyolefin layer may permit intrusion of water into the EVOH oxygen barrier layer during hot filling or retorting. Since polyolefins again become relatively impermeable to water upon cooling, moisture in the EVOH layer cannot escape through the polyolefin layer. Thus, we have concluded that the layer or layers which are on the outside of the package from the EVOH layer must be relatively permeable to moisture under normal storage conditions to permit the escape of moisture in the EVOH layer.

A suitable polymeric material for the package outside layer is nylon. Nylon is sufficiently permeable to moisture to permit the escape of moisture from the EVOH layer to restore the oxygen barrier quality, yet is sufficiently waterproof to permit accidental wetting of the package without harm. Nylon possesses all of the other desired properties for the outside of the package. Nylon is tough, flexible, not greatly affected by heat or cold, abrasion resistant, transparent, and can be printed upon for lable purposes. Nylon is not expensive and is one of the few polymers suitable for film structures to which EVOH will adequately adhere. Nylon can be coextruded with EVOH and with polyolefins. Thus, nylon is well suited for use as the outside surface layer overlying the EVOH barrier layer.

Since polyolefins do not adhere well to EVOH, steps must be taken to provide adequate adhesion to prevent delamination of the film structure. An interlayer of a polymeric material adherent to EVOH and to polyolefins may be used between the polyolefin inside heat seal layer and the EVOH oxygen barrier layer.

Where the inside layer heat sealable high melting polyolefin is high density polyethylene, suitable adherent, extrusible polymeric materials for the interlayer are those sold under the name Plexar by Chemplex Company of Rolling Meadows, Ill. These materials are blends of a polyolefin such as ethylene vinyl acetate with a graft copolymer of high density polyethylene and an unsaturated fused ring carboxylic acid anhydride.

Where the inside layer high temperature polyolefin is polypropylene or a blend of polypropylene and polyethylene or a copolymer of propylene and ethylene, suitable adherent, extrusable polymeric materials for the interlayer are those sold under the name Admer by Mitsui Petrochemical Company of Japan. These materials are acid anhydride grafted polyolefins.

The adherent polymeric materials sold under the names Plexar and Admer also adhere well to nylon. Since EVOH adheres well to nylon, a further interlayer of nylon on the inside face of the EVOH layer may be used. The adherent polymer is located between that nylon interlayer and the polyolefin inside surface layer.

FIG. 1 shows a heat sealed food pouch according to the invention. The pouch is formed by overlying two rectangles of film with the heat sealable high temperature polyolefin layers confronting each other and the nylon surface layer of the film on the outside. A conventional heat seal bar is used to autogenously weld the films together along seal line 12 extending along three of the four side flanges 14. After the food product is placed in the pouch, the fourth side flange is heat sealed.

The pouch of FIG. 1, after filling and sealing is ready for retorting. Filled Pouches are loaded in a pressure cooker or retort and cooked under pressure in water or steam at temperatures up to about 260° F. for times extending up to two hours. The times and temperature are related such that higher temperatures generally require shorter times. Many food products require about one-half hour at about 250° F. Other commercial sterilization techniques such as microwave or hot air heating can be employed.

The pouch of FIG. 1 can be hot filled with certain food products which do not require high temperature processing to achieve commercial sterility for adequate storage life. Examples of such foods are sugar syrups, ketchup, fruit juices, jellys and preserves, and high acidity foods. Hot filling is usually done at temperatures in excess of 180° F. The pouch may be immersed in a hot water bath during or after filling and sealing for a period of time sufficient to assure the destruction of molds and yeasts.

FIG. 2 shows a covered tray according to the invention. The tray 20 is thermoformed from relatively thick sheet stock which may be formed by extrusion coating the polyolefin side of the multi-layer film structure described above with an additional thickness of polyolefin on the inside surface of the tray. The nylon surface is on the outside of the tray. After deposit of the food product in the tray 20, a cover 26 of the multi-layer film is positioned over the tray with the heat sealable polyolefin surface confronting the polyolefin surface which is uppermost on the flanges 24 which form the periphery of the tray. Conventional heat sealing heater bars are used to heat seal the cover sheet to the tray flanges 24 along seal lines 22. The trays can be hot filled or retorted as is described above.

FIG. 3 is an enlarged cross-sectional view of a film structure according to the invention. The outside of the package is the nylon layer of the film. The barrier layer is the oxygen barrier material which preferably is a layer of ethylene-vinyl alcohol copolymer (EVOH). The inside layer is the heat sealable layer, preferably a polyolefin which heat seals at a temperature higher than that encountered in hot filling or retorting.

Between the barrier layer and the heat seal layer is an interlayer whose function is to securely bond the EVOH layer to the polyolefin heat seal layer. As illustrated, the interlayer is actually two layers; a nylon layer adjacent the EVOH an an adhesive polymer such as Plexar or Admer modified polyolefins. The nylon layer of the interlayer bonds well to EVOH and the adhesive polymer bonds well to the polyolefin heat sealable layer and to the nylon. The above described structure can be simultaneously coextruded in a single step to provide an economical film. Typically, suitable films range between 3 and 12 mils in thickness.

FIG. 4 shows the effect of moisture in the EVOH barrier layer on its oxygen permeability. At high water contents the oxygen barrier quality of EVOH is seriously degraded. Removal of moisture from the EVOH layer restores the oxygen barrier quality. Since hot filling and retorting occur at temperatures of 190° F. or higher, the good moisture barrier properties of polyolefins are impaired until lower temperatures are restored. During the time the package is exposed to hot filling or pre-cooking temperatures, moisture can migrate through the polyolefin layer into the EVOH barrier layer. Return of the package to room temperature causes the moisture in the EVOH to result in a relatively high relative humidity which impairs the oxygen barrier quality. The restoration of moisture impermeability of the polyolefin at room temperature prevents escape of the moiture.

FIG. 5 compares a film according to the invention with a control film which was a similar film to which a further layer of modified HDPE (Plexar II) was added outside the nylon layer. The film according to the invention was 7.5% nylon/20% EVOH/7.5% nylon/10% Plexar III/55% HDPE. The control film was 32.5% HDPE/7.5% nylon/20% EVOH/7.5% nylon/32.5% HDPE. The films were made into pouches which were filled and subjected to retorting. FIG. 5 shows that oxygen barrier quality improved because the nylon outside layer of the film of the invention permitted moisture entrapped in the EVOH layer to escape. The oxygen barrier quality of the film improved from a permeability of 650 cc/m²/day to about 20 cc/m²/day within 6 hours after retorting, whereas the control film which had a further layer of HDPE over the nylon only dropped from about 400 cc/m²/day to about 300 cc/m²/day in 24 hours. After a full day the control film still was 15 times more permeable to oxygen than the film of the invention. The HDPE outer layer of the control film prevented the escape of moisture from the EVOH barrier layer. The continued presence of moisture degraded the oxygen barrier quality of the control film.

FIG. 6 compares the relative weight as a function of time of a package in accordance with the invention with a control package having a layer of HDPE over the nylon layer outside the EVOH barrier layer. The films used were the same as those used in FIG. 5. The relative weight plotted is a measure of the percentage change in weight of water in the film. The relative weight is:

$$\frac{\text{weight at time } t - \text{original weight}}{\text{original weight}} \times 100$$

The packages were in the form of pouches filled with tomato paste. The packages were weighed to establish the original weight. The packages were then retorted at 250° F. for one-half hour. The retorted pouches were then weighed and weighed again on the 1st, 2nd, 3rd, 6th, 7th, 10th, 13th and 15th day following retorting. It is apparent that the packages according to the invention initially gained more weight during retorting than did the control packages. After one day the packages according to the invention had less moisture in the film than did the control packages. For the next two weeks the packages according to the invention continued to dry out more rapidly than the control packages and at all times following the first few hours contained less moisture than the control packages. The control packages were substantially unchanged in moisture content, always remaining at an unacceptably high moisture content as is reflected by the high oxygen permeability shown for the control packages in FIG. 5.

Transparent films according to the invention comprising a coextruded structure of 7.5% nylon/20% EVOH/7.5% nylon/10% Plexar III/55% HDPE having thicknesses between 4.5 and 6 mils were formed into pouches which were filled with potatoes, tomatoes, corn, carrots, beef stew, and green beans. Each of the packages was subjected to retorting at temperatures off at least 250° F. for at least one half hour. The packages were successful.

Films similar to those above were used to hot fill packaging of syrup and tomato paste. These packages were successful.

I claim:

1. A heat sealed package for commercial sterilization and unrefrigerated storage of food products, said package comprising multi-layer polymeric material, the layer which forms the outside surface of the package being relatively permeable to moisture at temperatures of unrefrigerated storage, the layer which forms the inside surface of the package being relatively impermeable to moisture at the temperatures of unrefrigerated storage, being relatively permeable to moisture at temperatures of commercial sterilization, and being a heat sealable polymer to produce a seal which will withstand commercial sterilization temperature, and an interior oxygen barrier layer consisting essentially of a vinyl alcohol polymer which is essentially free of acetal groups.

2. A package for commercial sterilization and unrefrigerated storage of food products, said package comprising multi-layer polymeric material, said multi-layer material comprising, in order: (1) a layer on the outside surface of the package, said layer being relatively permeable to moisture at temperatures of unrefrigerated storage, (2) an oxygen barrier layer consisting essentially of a vinyl alcohol polymer which is essentially free of acetal groups, (3) a layer which is relatively permeable to moisture at temperatures of unrefrigerated storage, (4) a layer of polymeric material adherent to both said third layer and a layer on the inside surface of the package, and (5) a layer on the inside surface of the package which is relatively impermeable to moisture at temperatures of unrefrigerated storage and is relatively permeable to moisture at temperatures of commercial sterilization.

3. The package of claim 1 wherein the layer which forms the outside surface of the package comprises nylon.

4. The package of claim 1 wherein the layer which forms the inside surface of the package comprises a polyolefin polymer or copolymer.

5. The package of claim 3 wherein the layer which forms the inside surface of the package comprises a polyolefin polymer or copolymer.

6. The package of claim 5 wherein the multi-layer polymeric material includes a layer of polymer adherent to the polyolefin layer and to the oxygen barrier vinyl alcohol layer.

7. The package of claim 5 wherein the polyolefin layer comprises a polyolefin selected from the group comprising high density polyethylene, polypropylene, copolymers of propylene and ethylene, and blends of polypropylene and polyethylene.

8. The package of claim 6 wherein the adherent polymer layer comprises a modified polyolefin.

9. The package of claim 8 wherein the polyolefin layer is high density polyethylene and the adherent layer is a polyolefin blended with a graft copolymer of polyethylene and an unsaturated fused ring carboxylic acid anhydride.

10. The package of claim 8 wherein the polyolefin is polypropylene or a polyropylene blend or propylene copolymer and the adherent layer is an acid anhydride grafted polyolefin.

11. The package of claim 5 wherein the multi-layer polymeric material comprises, in order, an outside surface layer of nylon, an oxygen barrier of ethylene-vinyl alcohol, a layer of nylon, an adherent layer of polyolefin blended with a graft copolymer of polyethylene and an unsaturated fused ring carboxylic acid anhydride, and an inside surface layer of high density polyethylene.

12. The package of claim 11 wherein the high density polyethylene surface of the multi-layer sheet material is extrusion coated with additional high density polyethylene and the resulting sheet is formed into a tray which is covered by a film of the multi-layer sheet material.

13. The package of claim 5 wherein the multi-layer polymeric material comprises, in order, an outside surface layer of nylon, an oxygen barrier of ethylene-vinyl alcohol, a layer of nylon, an adherent layer of an acid anhydride grafted polyolefin, and an inside surface layer which comprises polypropylene polymer or copolymer.

14. The package of claim 2 wherein the layer which forms the outside surface layer of the package comprises nylon, the layer of adherent polymeric material is an acid anhydride grafted polyolefin, the layer which forms the inside surface of the package comprises polypropylene polymer or copolymer, and the layer which is relatively permeable to moisture and which is adjacent the layer of adherent polymeric material is nylon.

15. A package for commercial sterilization and unrefrigerated storage of food products, said package comprising multi-layer polymeric material, said multi-layer material comprising, in order: an outside surface layer of nylon, an oxygen barrier layer consisting essentially of a vinyl alcohol polymer which is essentially free of acetal groups, a layer of nylon, an adherent layer of polyolefin blended with a graft copolymer of polyethylene and an unsaturated fused ring carboxylic acid anhydride, and an inside surface layer of high density polyethylene.

16. A package for commercial sterilization and unrefrigerated storage of food products, said package comprising multi-layer polymeric material, said multi-layer material comprising, in order: an outside surface layer of nylon, an oxygen barrier layer consisting essentially of a vinyl alcohol polymer which is essentially free of acetal groups, a layer of nylon, an adherent layer of an acid anhydride grafted polyolefin, and an inside surface layer which comprises polypropylene polymer or copolymer.

* * * * *